(12) United States Patent
Spickermann et al.

(10) Patent No.: US 11,366,230 B2
(45) Date of Patent: Jun. 21, 2022

(54) DEVICE AND METHOD OF OPTICAL RANGE IMAGING

(71) Applicant: OYLA, INC, San Carlos, CA (US)

(72) Inventors: Ralph Spickermann, Redwood City, CA (US); Srinath Kalluri, Palo Alto, CA (US); Siddharth Jain, San Mateo, CA (US)

(*) Notice: Subject to any disclaimer, the term of this patent is extended or adjusted under 35 U.S.C. 154(b) by 517 days.

(21) Appl. No.: 16/604,006

(22) PCT Filed: May 30, 2019

(86) PCT No.: PCT/US2019/034509
§ 371 (c)(1),
(2) Date: Oct. 9, 2019

(87) PCT Pub. No.: WO2019/245719
PCT Pub. Date: Dec. 26, 2019

(65) Prior Publication Data
US 2021/0325540 A1 Oct. 21, 2021

Related U.S. Application Data

(60) Provisional application No. 62/688,165, filed on Jun. 21, 2018.

(51) Int. Cl.
*G01S 17/894* (2020.01)
*G01S 7/481* (2006.01)
*G01S 7/4863* (2020.01)

(52) U.S. Cl.
CPC .......... *G01S 17/894* (2020.01); *G01S 7/4816* (2013.01); *G01S 7/4817* (2013.01); *G01S 7/4863* (2013.01)

(58) Field of Classification Search
CPC .... G01S 17/894; G01S 7/4816; G01S 7/4817; G01S 7/4863; G01S 17/931
See application file for complete search history.

(56) References Cited

U.S. PATENT DOCUMENTS

| 7,532,311 B2 * | 5/2009 | Henderson | .............. G01S 17/89 356/28 |
| 2002/0043561 A1 * | 4/2002 | Tsikos | .................. G07G 1/0054 257/E29.144 |

(Continued)

*Primary Examiner* — Jared Walker
(74) *Attorney, Agent, or Firm* — Kim Rubin Patent Agent

(57) ABSTRACT

An optical device creates 3D images comprising a field of points, each point comprising horizontal, vertical, and distance metrics. The device comprises an illumination subsystem, comprising light sources, such as LEDs, a non-resonant beam steering element such as a micro-electro-mechanical system (MEMs) mirror, beam-shaping optics, a beam director plate, and a diffuser. The device also comprises an imaging subsystem with one or more optical detector chips that measure time-of-flight (TOF). Devices may dynamically and sequentially images solid-angle sub-regions of interest, in an arbitrary order, out of a total FOV, using eye-safe illumination. The corresponding received image portions are stitched together. The beam steering element is non-resonant, allowing arbitrary and rapid changes to its pointing vector. Beam shaping optics generates rectangular solid-angle illumination. One detector chip integrates light from one sub-region while another chip is reads out image data.

20 Claims, 7 Drawing Sheets

(56) References Cited

U.S. PATENT DOCUMENTS

| | | |
|---|---|---|
| 2003/0150916 A1* | 8/2003 | Tsikos ................ G02B 19/0028 235/454 |
| 2012/0287417 A1 | 11/2012 | Mimeault |
| 2016/0047897 A1 | 2/2016 | Dussan |
| 2016/0327779 A1* | 11/2016 | Hillman ................ G02B 21/361 |
| 2018/0059221 A1* | 3/2018 | Slobodyanyuk ...... G01S 7/4814 |
| 2018/0059248 A1 | 3/2018 | O'Keeffe |
| 2018/0128903 A1 | 5/2018 | Chang |
| 2018/0143305 A1 | 5/2018 | Buskila et al. |
| 2019/0041518 A1 | 2/2019 | Spickermann et al. |

* cited by examiner

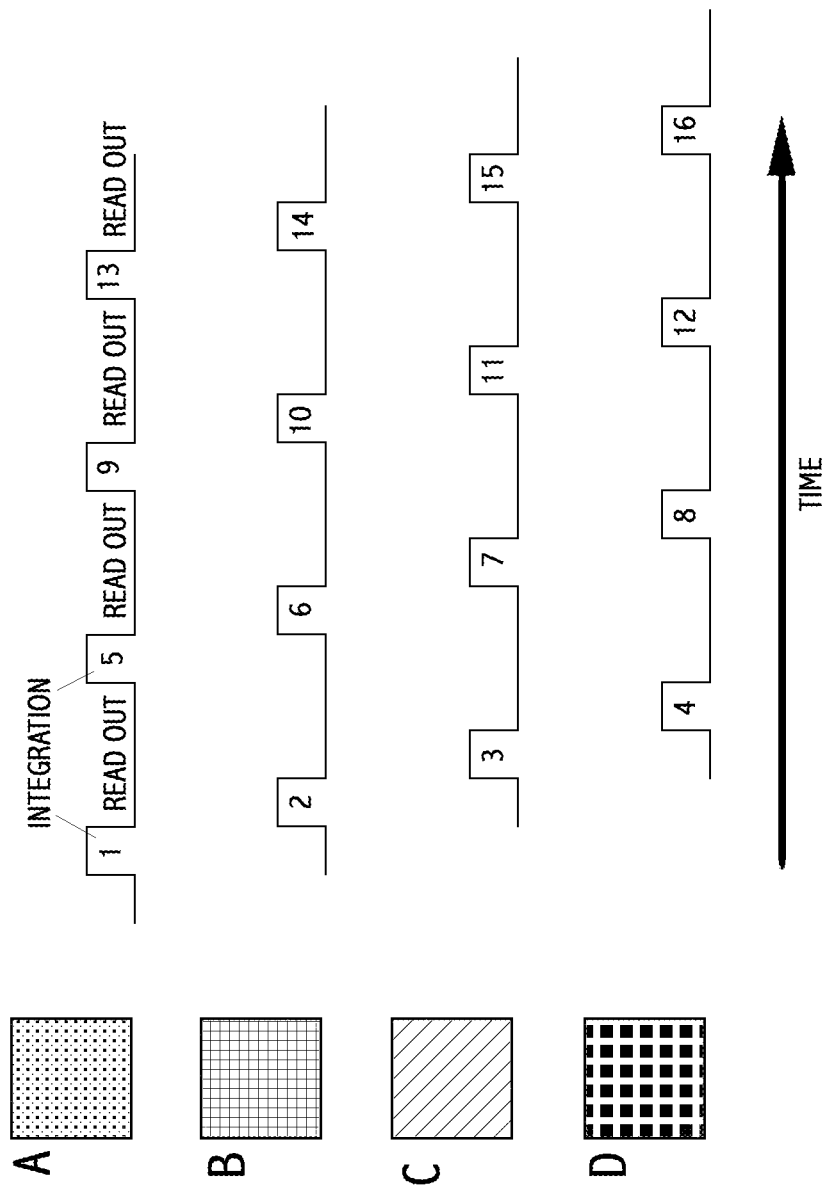

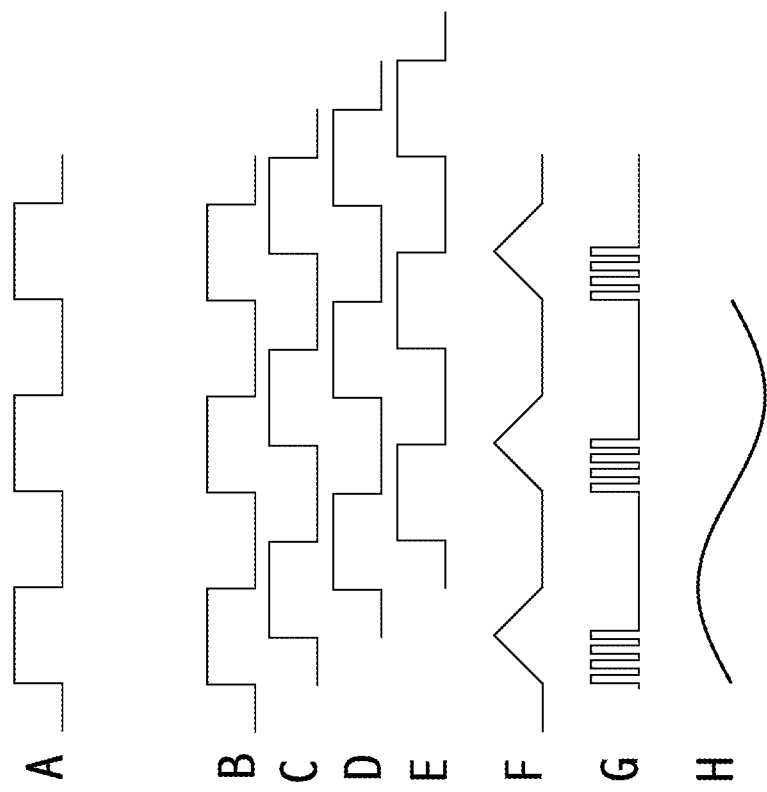

DEVICE AND METHOD OF OPTICAL RANGE IMAGING

PRIORITY

This application claims priority to U.S. Provisional Application No. 62/688,165, filed 21 Jun. 2018.

FIELD OF THE INVENTION

This invention is in the field of optical, wide field of view, "3D imaging" ranging devices such as scanning LIDAR.

BACKGROUND OF THE INVENTION

Devices such as LIDAR are useful for autonomous vehicles and other applications to create a, digital, three-dimensional (3D) representation of objects within a field of view (FOV). LIDARs may be used by autonomous vehicles to find, and then quickly identify, nearby objects. They have numerous other applications, including safety, construction, and mapping. Prior art LIDARs use high-intensity, sharply pulsed parallel laser beams or FMCW (Frequency Modulated Continuous Wave) modulated beams, which are continuously scanned. This scanning is done either by rotation around a mechanical axis or by light reflection off spinning or resonantly vibrating mirrors. Alternatively, prior art devices use high intensity flash techniques to illuminate the entire field of view at once. These techniques are expensive, slow, bulky, unreliable, and typically have either a limited range or a limited angle of view. Some prior art devices are not eye-safe. Prior art devices operate in a fixed scanning pattern. As such, they cannot be dynamically configured to look a narrower field of view, or to look specifically for closer or more distant objects, or to dynamically increase scan rate, to change light integration time. Prior art devices using rotating optical elements or resonant mirrors are inflexible with respect to dynamic scan order, dynamically changing a field of view, or dynamically changing light integration time.

Further, prior art devices, such as those using laser beams, image a single point at a time and scan such points in a line. Devices using pixel array imaging chips typically have a very short range and poor resolution.

SUMMARY OF THE INVENTION

Embodiments of this invention for 3D optical range imaging overcome the weaknesses of prior art. In particular, embodiments permit scanning segments of a field of view in an arbitrary order, and with variable light integration time. This avoids wasting a large fraction of total scan time or a large fraction of a total field of view, when only a portion of a field of view is currently interesting. A first technological problem to solve is lack of dynamic imaging flexibility in the prior art. A second technological problem to solve is the cost, size, weight, and relative unreliability of rotating or resonant mechanical elements. Imaging only selected portions of a total FOV provides faster image update rate than prior art.

Embodiments of the present invention employ two or more time-of-flight (TOF) pixel array devices in conjunction with illumination of a target field of view (FOV) in sequential segments, or portions, which are then stitched together to form a 3D representation of objects in a target field of view. Each such segment, or "reduced field of view," is illuminated and imaged at once, rather than pixel by pixel sequentially.

Embodiments comprise an illumination subsystem and an imaging subsystem. The combination of the illumination subsystem and the imaging subsystem, plus other necessary elements for implementation, make up an imaging system. The only moving part is a one-axis or two-axis, micro-electromechanical system mirror (MEM mirror or MEMs mirror), which is only in the illumination subsystem; the imaging subsystem is free of moving parts. The illumination subsystem illuminates a series of contiguous reduced fields of view, called illumination reduced fields of view, which in aggregate align to create and image a total target field of view. "Reduced field of view" is a term used to refer to segments or regions of the total field of view of the device, for either the illumination subsystem or the imaging subsystem. The imaging subsystem comprises two or more imaging chips, each chip comprising an array of light sensitive sensors, where each such sensor has associated with it a TOF detector, which determines the amount of time light takes to travel from the illumination subsystem, to an object surface, and then reflected back. Such travel time is then used to compute a distance to the corresponding object reflective surface. Such sensor chips are called time-of-flight (TOF) pixel array devices, or sometimes in the art, "3D imagers." Note that the TOF devices themselves are two-dimensional arrays of pixel sensors, also called image sensors, detectors or simply chips. The "3D" term comes from that fact that each pixel outputs both an analog (or digital) light intensity value and a time delay value. The time delay value is associated with a distance to the object portion reflecting light to that pixel. Intensity output may be a single bit, representing presence or absence of a corresponding object surface portion, within the distance and sensitivity detection range of the system incorporating the sensor. Such terminology may be applied to a single pixel in the sensor, a group of pixels, an entire chip, or more than one chip operating harmoniously within one or more pieces of LIDAR equipment, such as described herein.

The illumination subsystem comprises a continuous wave (CW), modulated light source. The modulation signal is synchronous with a demodulation signal, used by a demodulator in the imaging subsystem.

Each imaging TOF chip and its associated focus lens images a portion of the total FOV, the portions called imaging reduced fields of view. The number of illumination reduced fields of view is P and the number of imaging reduced fields of view is N. N is also the number of focus lenses. P is an integer multiple of N. Each image sensor's imaging reduced field of view images P/N illumination fields of view. The MEMs mirror is non-resonant, moving to each of P positions in an arbitrary sequence. For example, there may be four (N=4) image sensor chips and sixteen (P=16) used angles of the MEMs mirror, where each image sensor chip then images four (P/N=4) illumination reduced fields of view. In this example, each imaging reduced field of comprises four illumination reduced fields of view. The total target FOV, is defined by all sixteen contiguous illumination fields of view, and also is defined by all four contiguous imaging reduced fields of view. Ideally, the group of all illumination reduced fields of view is the same as the group of all imaging reduced fields of view, subject to edge overlap and optical alignment.

The non-resonant, one-axis or two-axis MEMs mirror operates in a "step and stare" mode, where each of the P positions is selected by a controller in any arbitrary order. The mirror is moved to a selected pair of angles (one for each axis of rotation of the mirror), and then held fixed. Light from the modulated light source reflects off the mirror, through one of P portions of a beam director, such as a prism array of P prisms, through a diffuser, and finally out of the device. A beam director may also be called a, "directional lensing element" or elements. The beam director directs a light beam to one of P beam directions, or beam direction angles. The light illuminates an illumination reduced field of view of the whole target FOV. Light from objects in this selected illumination reduced field of view reflects back to the device, where it is focused by one of N focus lenses to its associated one of N image sensor chips. A portion of that image sensor then integrates reflected light for a selected amount of time, which may be dynamically selectable. Then, the mirror moves ("steps") to a next position, illuminating ("stare") another reduced field of view. This continues, until all 16 (P=16 in this example) reduced fields of view are illuminated and imaged. Then, the process repeats. A novel aspect of this embodiment is that the reduced fields of view, "segments" (also called regions) of the total FOV, may be illuminated and imaged in any arbitrary order. This permits portions of the total FOV to be selected for either more frequent imaging or longer time-period imaging. For example, a region of interest might be imaged 60 times per second, while the total target FOV is imaged completely only 15 times per second. As another example, distant or dim objects may use a longer integration time than near objects. The frequency or signal shape of the modulator signal may be changed to provide a different, or larger, total distance dynamic range of an embodiment, or to improve the signal-to-noise ratio of received signals.

The illumination reduced fields of view may be arranged in the total FOV as a one-dimensional or two-dimensional grid. For example, the total FOV may comprise two rows, one above the other, each row comprising eight segments.

There are then 16 total segments, each segment, or first reduced field of view, being illuminated in a sequence. A one-dimensional grid may comprise a series of high-aspect ratio rectangles, as a non-limiting example.

Typically, image sensor chips operate either in an "integration" mode, wherein all the individual pixel light sensors integrate light, or in a "read out" mode where data in the chip is read out. Typically, the chip operates alternately and repetitively between these two modes. However, read out time can be significant. Thus, a single chip is not able to be integrating light full time. A key feature of embodiments is the use of multiple, N, image sensor chips, where while one chip is integrating light, one or more of the other chips is reading out data. In this way, some portion of the total FOV is being illuminated and imaged, avoiding the "dead time" of single-sensor prior art. Other operating modes and sequences are possible, and those described herein are non-limiting. In particular, pixels may be combined into groups, pixels or associated electronics may be arranged in rows or other portions of a chip that may operate independently or with different operating parameters.

BRIEF DESCRIPTION OF THE DRAWINGS

FIG. 6 shows an exemplary timing diagram for four sensors.

FIG. 8 is a schematic showing exemplary signals related to synchronization.

All drawings are of schematic, not to scale, exemplary embodiments only, show only selected elements, and are non-limiting.

DETAILED DESCRIPTION

Scenarios, options and examples are non-limiting embodiments.

The exact acronym for LIDAR varies in the art. It may be Laser Detection And Ranging; Light Detection And Ranging; LIght Detection And Ranging; a combination of the words light and radar. Our usage herein is LIght Detection And Ranging; however the exact acronym is non-limiting. Other terms for LIDAR include, "3D optical ranging."

Figure 1:
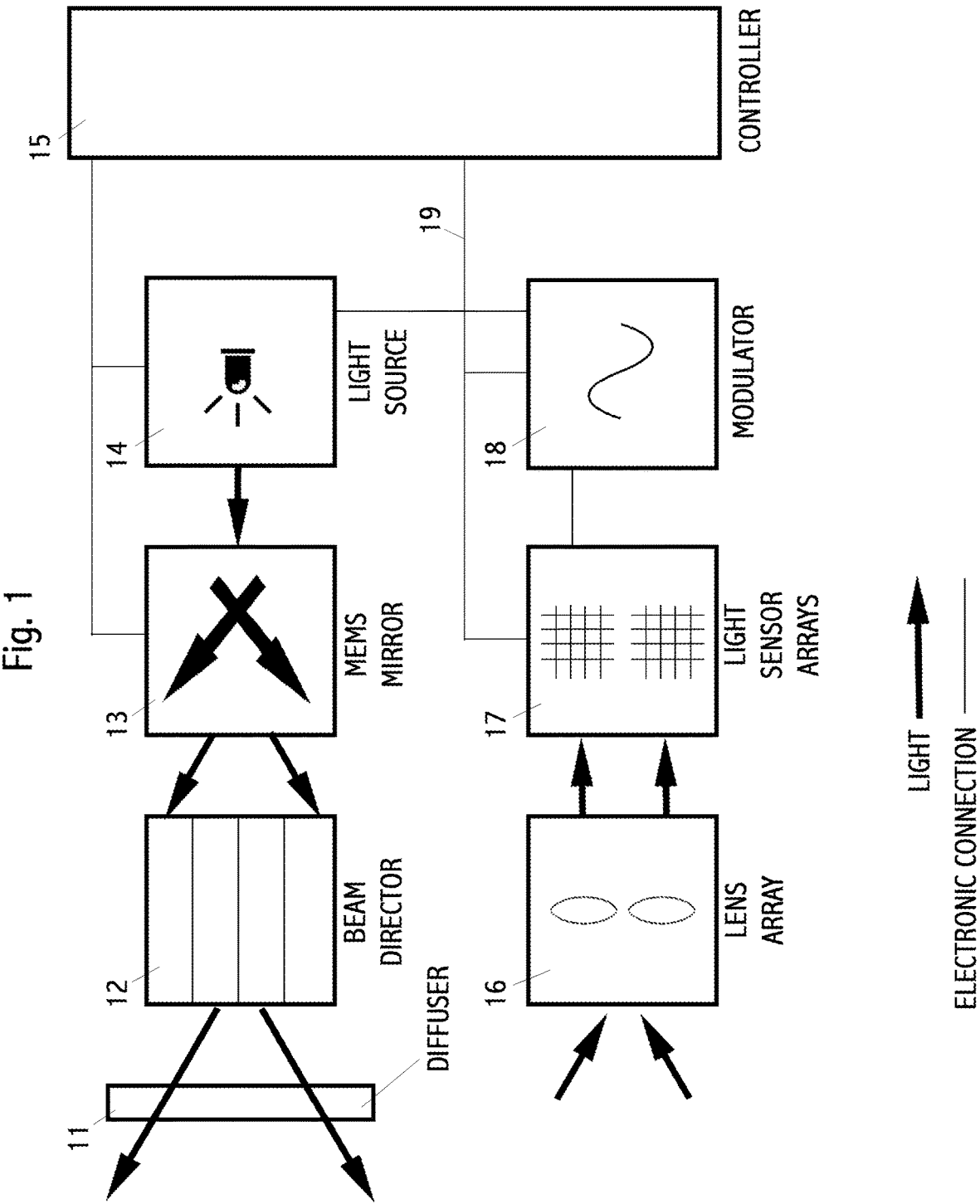
FIG. 1 shows an exemplary system schematic with major elements and their interconnection.

Turning first to FIG. 1, we see a schematic of major elements in an embodiment. The upper half of the Figure is primarily elements in the illumination subsystem and the lower half of the Figure is primarily elements in the imaging subsystem. To the right is a controller comprising control electronics, such as a processor, data and program memory, input/output interfaces, power supplies, and the like. 14 shows a continuous wave, modulated light source such as one or more LEDs, solid-state lasers, or other modulated light sources. A modulated light source may use an amplitude modulated continuous wave (AMCW). A simple embodiment uses a single light source. Modulation of the light source 14 may be a sine wave, square wave, pulsed, or another modulation wave shape. A beam of light from the light source 14 reflects off a one-axis or two-axis controllable, quasi-static (also called "step and stare," or "non-resonant"), micro-electro-mechanical mirror (MEM or MEMs mirror), also called a solid-state mirror, 13. A key aspect of the non-resonant MEMs mirror 13 is that it may be pointed at any arbitrary (two) angles within its total range, in any arbitrary order, then remaining at those two angles for an arbitrary length of time. Although technically a two-axis mirror has two angles, common usage in the art is to refer to the pair of angles as one, "angle." Some embodiments use more than one MEMs mirror. In some embodiments, the MEMs mirror 13 rotates on two axes; thus, it has two dynamically settable angles. In other embodiments, the MEMs mirror has only one axis of dynamically settable angles. In yet other embodiments, "the MEMs mirror" comprises two separate MEMs mirrors, each with settable angles. Collimating optics may be used between the light source 14 and the MEMs mirror 13, not shown. Collimating optics may be used between the MEMs mirror 13 and the beam director 12, not shown. Such collimating optics may be used to change the transverse beam shape. For example, a Gaussian beam shape may be changed to square or flat-top or top-hat shape. Such modified beam shapes may be advantageous for more uniform illumination over an illumination reduced field of view. Such collimators are specifically claimed as an element. Directed light beams reflect off the MEMs mirror, and then pass to a beam director 12, which has a number of physical partitions, segments, regions, sub-elements or areas, with a count of P such regions, where P is two or more. Here, four such regions are shown, highly-schematically. In some embodiments, the beam director may be viewed as expanding the narrow input beam angle range from a range obtainable by the MEMs mirror, to a wider beam angle range. The wider beam angle range permits a wider total field of view. In one embodiment, the beam director comprises P prisms. In other embodiments, the beam director comprises an engineered diffraction grating. Alternative optical elements than these two just named may be used. In some embodiments, the beam director uses a passive optical element; however, in other embodiments the beam director may be an active, controllable element. The beam director may pass light through it, such as when prisms are used, or it may reflect light. Another name for the beam director 12 is a diffractive optical element. Yet another name for a beam director is beam director plate. A beam director may comprise an engineered diffraction grating.

Light from the beam director 12 then passes through diffuser 11, discussed more below. A diffuser 11 may be an engineered or simple light diffusion screen. A diffuser 11 is important to achieve eye-safe operation, a major benefit of embodiments over prior art. A diffuser may have a statistically chosen distribution of microscopic lenslets that randomizes a wave front of an incoming optical beam and may also introduce or produce a predetermined beam divergence or predetermined beam shape. A diffuser may comprise one or more diffuser segments. Each such segment may have a different divergence and/or a different beam shape. An alternative name for a diffuser is a diffuser window. Such a diffuser or diffuser window may also provide the function of a device physical window.

The light source 14 and the MEMs mirror 13 are controlled, directly or indirectly, electrically, by the controller 15. Electrical or electronic paths are shown as light lines. Only major electrical connections are shown; they may be unidirectional or bi-directional. Light paths are shown in FIG. 1 as heavy arrows. However, these are schematic only; directions of arrows in the Figure are not indicative of actual optical paths. Any reflective or transmissive optical device that functions, in embodiments, effectively equivalently to a MEMs mirror is explicitly included in the scope of claims. Small position changes of the MEMs mirror may be used for calibration.

Continuing with FIG. 1, the lower half shows primarily elements in the imaging subsystem. Light from the illumination subsystem, exiting the diffuser 11 to the left in the Figure, towards a non-shown field-of-view (FOV), typically containing an object or target of interest. This light reflects off of one or more objects of interest in a target FOV. This reflected light re-enters the device from the left side of the Figure towards a lens array 16. The lens array may have N focus lenses. Light passing through the lenses in the array 16 is focused on imaging light sensors in the light sensor array 17. There is a one-to-one correspondence of lenses to imaging light sensors. Thus, with N lenses there are N imaging light sensors. The graphics in the Figure are not indicative of the number N, which is two or more, and which is discussed below. Image data from the image sensors passes to the controller 15.

Continuing with FIG. 1, the image sensors may be chips or modules. Individual pixel sensors in the image sensor are arranged in a grid, similar to traditional image sensors commonly found in digital cameras. Because of this, we refer to the physical structure of the image sensor, or "sensor chip," as two-dimensional (2D). However, associated with each pixel sensor, or with each small group of adjacent pixel sensors, is a light detector responsive to both amplitude of light on the sensor, as imaged by an associated lens, and also to a demodulation signal. Output from this "light detector" is often referred to in the literature as a "time-of-flight," or TOF. However, while this output is in fact responsive to a time-of-flight, it is not typically, by itself, actually a time-of-flight. It may be an analog value, a digital value, or set of values. For example, an imaging system might acquire four such outputs, each corresponding to four different phase shifts between and illumination modulation signal and an imaging demodulation signal. Note that less or more than four such outputs may be used to compute or generate time-of-flight or a related value or values. For example, an output may comprise a "saturation" bit, which typically indicates that too much light has been received and thus is not likely to be useful in computing a time-of-flight. Computation and analysis of signals within an imaging subsystem may be accomplished by or within a variety of electronic elements. For example, all or most such computation may occur inside of a single chip, such as a detector chip; or it may be in a module or subsystem. In some embodiments an element may be remote from a sensor chip. Elements may comprise controllers, processors, CPUs, microcontrollers, dedicated chips, programmable chips or arrays, gate arrays, FPGAs (field programmable gate array), and the like. Time-of-flight outputs may be a scalar responsive to a time-of-flight of light from the illumination system, then reflecting off a surface in a field of view, and then focused by a lens to a corresponding portion of image sensor, such as one pixel or a group of pixels. Time-of-flight outputs may also comprise an illumination amplitude value, a confidence value or vector, a saturation value or bit, a noise value, a background illumination value, a motion value or vector, or other values, vectors or bits responsive to light received by the pixel or group of pixels. In a preferred embodiment, four separate differential light amplitudes are communicated from a sensor chip, for each pixel, responsive to four separate phase shifts between a modulation signal in the illumination subsystem and a demodulation signal used by the pixel, to a processing element, which combines the four sensor output chips to produce a single vector comprising a time-of-flight value and an amplitude value for each pixel. Another embodiment uses two different phases for demodulation. A preferred embodiment may also produce a confidence scalar, which may be one bit, for each pixel. A processing element may also be called a processor or controller; or, a processing element may be part of a processor or controller.

The TOF element measures the time delay from the light source 14 to the image sensor, which is then used to measure or compute a distance from a portion of an object of interest from the embodiment. In this way a 3D representation of the object of interest may be generated. Because of this, such image sensors chips are sometimes called, "3D image sensors," with the word, "3D" representing an intended use of an image sensor, not the arrangement of pixel sensors on the chip. Because each pixel in the image sensor comprises a fixed, known X-Y location on the chip and outputs a value responsive to (i) the amount of incident light, (ii) the time that the light was integrated, and (iii) the demodulation signal, the combination of the fixed X-Y location and the output value may be used to calculate or determine a 3D coordinate of a portion of the object of interest, often called a voxel. In some embodiments, pixels are grouped, with each group providing a group output.

Continuing with FIG. 1, the light source 14 and the light sensors (in array 17) comprise or use a modulation signal and synchronous demodulation signal, respectively. A modulation signal from a modulator 18 is used to modulate the light source. The TOF detectors in the image sensors also use a second signal, synchronized to the modulation signal, as a demodulation signal. See also FIG. 8. More than one demodulation signal may be used. The demodulator may be inside of a sensor chip, or may be part of a sensor array, or may be a separate electronic element. The modulator typically provides a constant frequency waveform. However, the frequency may be variable and controllable, such as by a voltage-controlled oscillator (VCO). The shape of the waveform, phase and amplitude may also be either fixed or dynamically controllable, as described elsewhere herein. The modulator may be a separate element, such as indicated by 18 in the Figure, or may incorporated into other elements, such as in the light sensors (in array 17), the light source 14, of the controller 15. A modulator may be external to an embodiment, in which case the proper construction of the modulator 18 an input in the embodiment that receives such an external signal. The modulator may have fixed output, in which the control of modulator by the controller comprises an on/off function, which may correspond to whether the embodiment or an element in the embodiment is powered or not. The TOF detectors in an image sensor may or may not use phase of the modulation signal. For example, they may have both a first light integrator and a second light integrator, for each pixel, that uses the modulator signal phase shifted, or delayed, such as by 90° or 180°, non-limiting, between the two light integrators. Values from the two light integrators may be subtracted one from the other. One term in the art is, "quadrature demodulation," or use of a, "quadrature detector." In some embodiments, a portion of the controller 15 may be located outside of the embodiment, in which case a proper construction of the term, "controller" is for those control functions internal to the embodiment plus inputs from the external controller. In addition, claimed embodiments of devices, methods and systems include systems wherein elements of a claim that are physically external to an embodiment enclosure, such as may be provided by a third party, or during installation, or by an end-customer. Electronic connections 19 comprise multiple signals. They comprise data output from the light sensor arrays responsive to time-of-flight. Typically, the controller 15 comprises program and data memory to process such sensor data outputs to generate usable time-of-flight data, as discussed elsewhere herein. A controller may have functions such as all or part of image processing, data read out, initialization, chip control, device control, error detection, synchronization, communication, and the like. Data read out time may include associated data reading or processing time by a controller or image processor.

A light source may have a primary operating light wavelength of 850 nm, 940 nm, 1550 nm or other frequency or frequencies. Wavelengths including human-visible wavelengths may be used. Deep infrared (IR), including thermal imaging wavelengths, may be used. Embodiments may includes spectral filters, such as high-pass, low-pass or band-pass, at any point in any optical path. Optical filters may be implemented as coatings on optical elements. In general, it is desirable to pass only frequencies of the light source into individual image sensor elements (pixels). A frequency filter may be implemented on or in an image sensor chip.

An image sensor chip or module 17 may incorporate CMOS technology, photodiodes, CCDs, Silicon, GaAS, or other light-sensing solid-state technology, in any combination. A single-photon avalanche detector (SPAD) or avalanche photodetector arrays (APD) may be used. Another name for an image sensor chip is, "TOF Imaging Chip Array." Note that this term of the art for a single sensor chip is confusing as embodiments use two or more image sensor chips, and such an arrangement is called herein, "light sensor arrays," 17. An "illumination beam generator" may comprise a light source, or may comprise a light source and collimating optics between a light source and a MEMs mirror.

Figure 2:
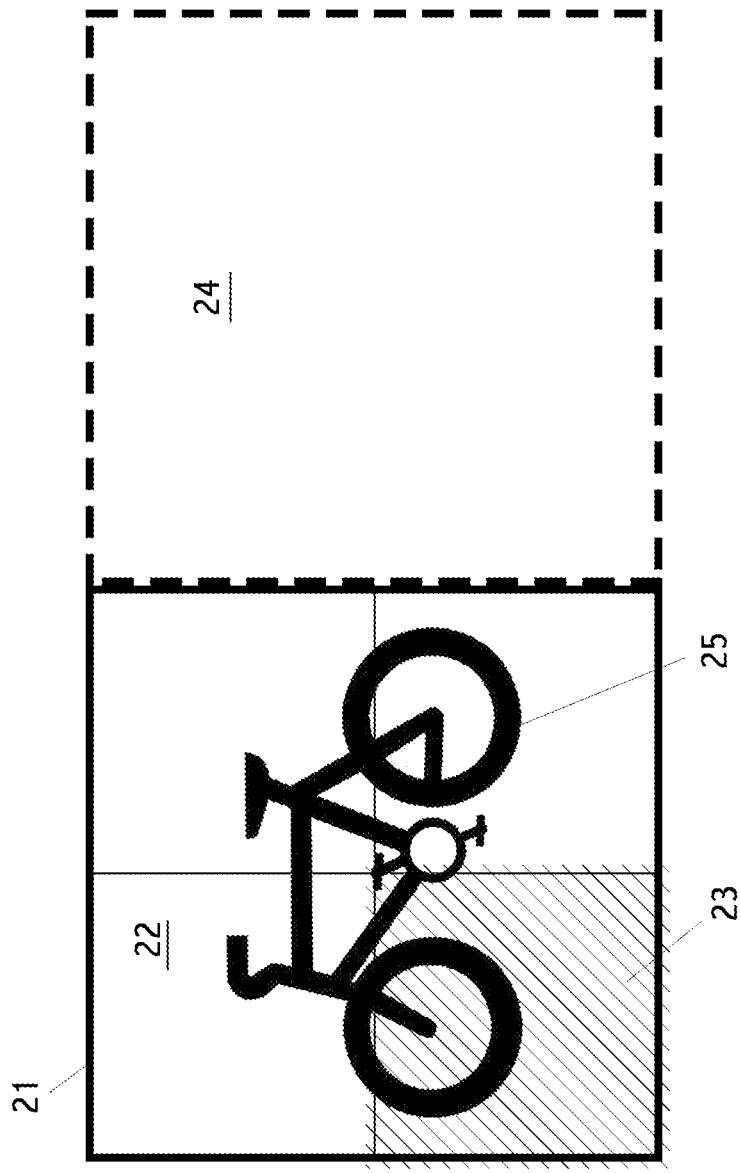
FIG. 2 shows an illustration of exemplary illumination and imaging reduced fields of view.

Turning now to FIG. 2, we see a simple but important improvement over prior art. Here, bicycle 25 represents an object in a FOV of an embodiment or the bicycle as imaged by an embodiment. The entire bicycle may be imaged by a single image sensor, which is indicated by the heavy black square 21. The heavy black square 21 represents one imaging reduced field of view. Portions of bicycle 25 are illuminated and imaged separately, at different times. For example, if P equals four times N (in an embodiment), then each image sensor will image the bicycle in four sections, each of which will be illuminated at a different time. A single illuminated region is illustrated by the hatched area 23, which represents one illumination reduced field of view. N is a predetermined number of lenses and image sensors in an embodiment. Since N is more than one, there is also a portion of a total FOV imaged by a second image sensor, as indicate by dotted heavy square 24. Squares 22 and 23 represent, schematically, each an exemplary single imaging reduced field of view. That is, a field of view that is imaged by an individual image sensor. Four squares like 22, indicated by light lines (one of four imaging reduced fields of view is shown by reference designator 22) indicate schematically areas or segments of the total FOV that are illuminated at one time by the illumination subsystem. Such an illuminated area is a first reduced field of view. The symbol P is used to indicate the total number of areas (first reduced field of views) that an embodiment may illuminate one at a time. P also indicates the number of directional elements in the beam director. P is typically an integer multiple of N. Embodiments of the characteristics described in this paragraph are typically for embodiments that have one light source (which may have more than one light emitter) and one MEMs mirror. Other embodiments may have more than one light source sharing a single common MEMs mirror, or may have more than one MEMs mirror. For such embodiments, more than one first reduced field of view may be illuminated at once. Thus, in an embodiment represented by this Figure, an image sensor represented by area square 21 requires four separate illumination, integration and read out steps to image the entire bicycle 25. Other terms for "read out" are "readout" or "upload."

Continuing with FIG. 2, we see a representation of "contiguous" alignments of both illumination reduced fields of view (e.g., hatched area 23) and imaging reduced fields of view (e.g., squares 21 and 24). In a perfect world, with perfect optical alignment and no manufacturing tolerances or mechanical drift, and no vignetting in either illumination of imaging subsystems, such reduced fields of view could be perfectly contiguous, that is, without image gaps, so that pixels or voxels from two different reduced fields of view align perfectly. In particular, it is desirable that continuous object surfaces are imaged without gaps. However, in order to tolerate such manufacturing tolerances, mechanical drift and vignetting, and improve image "stitching," reduced fields of view are typically slightly overlapped. However, they function in the complete embodiment as if they are contiguous and perfectly aligned, and therefore we use this term herein. Such "imperfect" contiguousness is indicated schematically by the overlap of the hatched area 23 with the light lines that indicate boundaries of first reduced fields of view, and also overlap the boundaries of the solid box 21, which indicates an imaging reduced field of view. Note also that two imaging reduced fields of view in the Figure, 22 and 24, are also not perfectly contiguous with each other, although in this Figure they do not quite touch, rather than overlap. Such an arrangement is possible but generally undesirable as it potentially leaves portions of a total FOV as being invisible to the embodiment. Such variations of "contiguous" may be managed during stitching, calibration, or post-processing.

Figure 3:
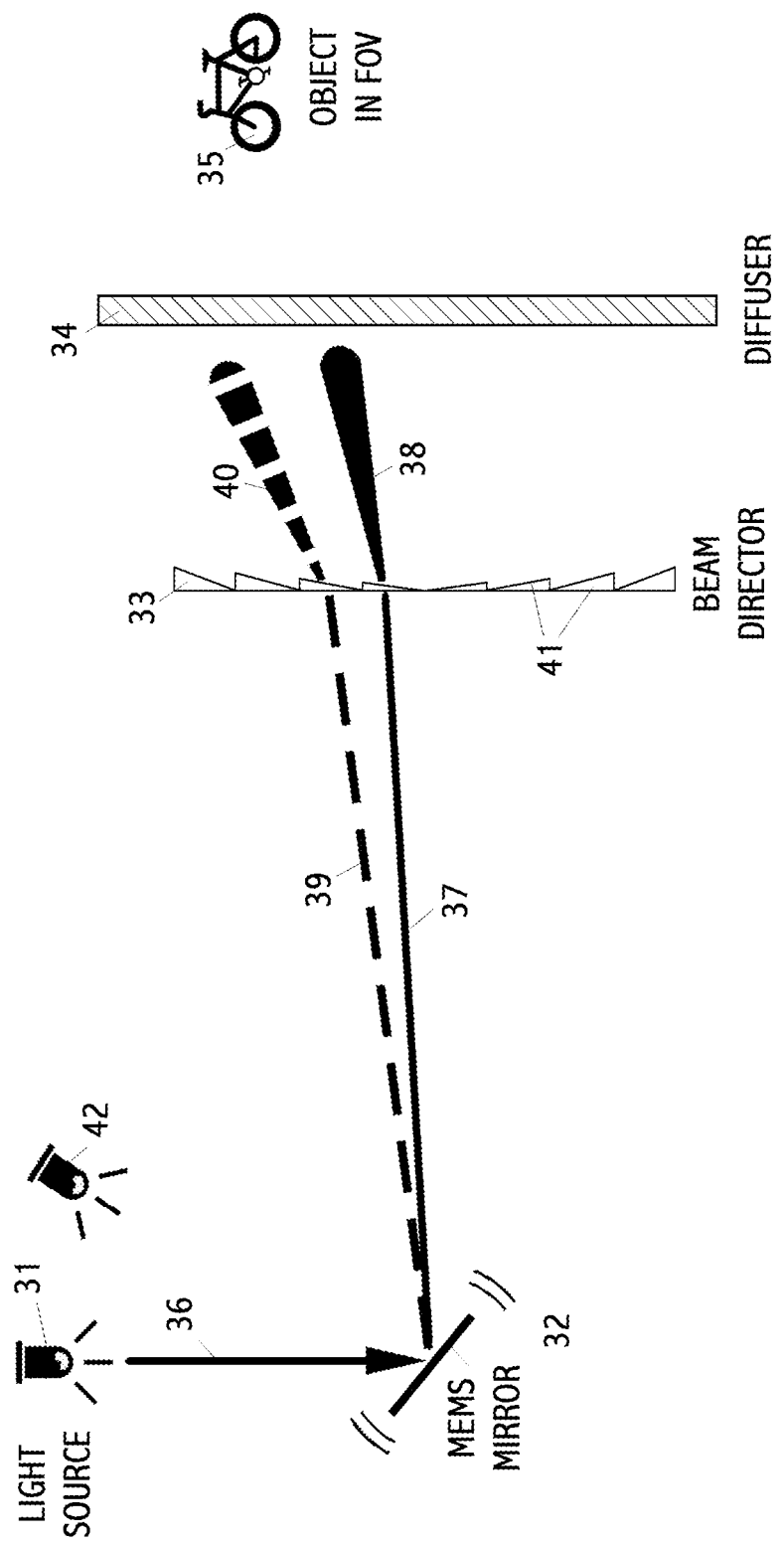
FIG. 3 shows optical paths of an exemplary illumination subsystem.

Turning now to FIG. 3, we see key elements of the illumination subsystem. 31 shows a continuous-wave, modulated light source, an AMCW, also discussed additionally elsewhere herein, and shown as 14 in FIG. 1. 42 shows an optional additional modulated light source. Such additional light sources as 42 permit, in some embodiments, more than one illumination reduced field of view to illuminated, and then imaged, at the same time. Light from light source 31 passes to a MEMs mirror 32, also discussed additionally elsewhere herein. The light source is generally predetermined, however, it is typically modulated by a modulator (18 in FIG. 1). Light from light source 31 may pass through collimating optics before reaching the MEMs mirror 32. The position of the MEMs mirror 32 is shown as selectable by symbolic motion lines. Two different angles of the MEMs mirror are indicated by the solid line 37 and the dashed line 39. Although the MEMs mirror is typically rotatable in two axes, the view in FIG. 3 is showing only two angles from a single axis, normal to the page. Light from the MEMs mirror 32 then passes through a selected portion of a beam director 33. An embodiment of beam director 33, as shown, is an array of prisms. Two such prisms are identified as 41. As shown, this beam director 33 has 8 prisms and thus supports 8 different beam angles from the MEMs mirror 32. However, a prism-based beam director 33 has, in some embodiments, two or more rows of prisms. For example, beam director 33 might have two rows of prisms (the second above or below the page), then supporting a total of 16 different beam angles. This number, 16, is one example of the number P, as used elsewhere herein. Note that MEMs mirror 32 might support any number of angles. However, since the beam director has P segments, only P different MEMs mirror angles would be used in practice, not counting variations for calibration, tolerance, drift, testing, and the like. The number of segments, P, in the beam director, is predetermined, being fixed at manufacture, assembly or configuration of an embodiment.

Continuing with FIG. 3, as light exits through beam director 33 it is bent, or "directed" to an angle different than the incoming angle. This is shown as lines 38 and 40 at different angles than lines 37 and 39, respectively. A beam director 33 may optionally also spread the beam, such as indicated by light beams 38 and 40 spreading. Light from the beam director then passes through a diffuser 34, towards an external scene in a FOV, indicated by the bicycle object 35. For clarity, the Figure does not show light passing through the diffuser 34 or illumination a portion of the total FOV around object 35. Note that the shown two beams 37-38 and 39-40 are not on at the same time, as the MEMs mirror 32 may have only one angle (that is: pair of angles, one for each axis) at a time. Thus, the illumination subsystem as shown in this Figure, can illuminate one of P illumination reduced fields of view at once. Unlike prior art laser LIDARs, however, an entire illumination reduced field of view is illuminated at once. That is, unlike prior art laser LIDARs, which can illuminate only a single voxel (or a small number, depending on the number of individual laser beam) at once, embodiments can illuminate an entire illumination reduced field of view, which may be imaged in parallel by hundreds of thousands of pixel sensors, and thus generate hundreds of thousands of scene voxels in parallel, from a single light source and single illumination light beam. The widening optical beams 38 and 40 are indicative of such a larger illumination area at the target scene (comprising bicycle object 35). That is, each beam 38 or 40 illuminates, respectively, two different illumination reduced fields of view. This Figure is schematic only and not to scale. Light sources 31 and 42 may be different brightnesses or colors.

Figure 4:
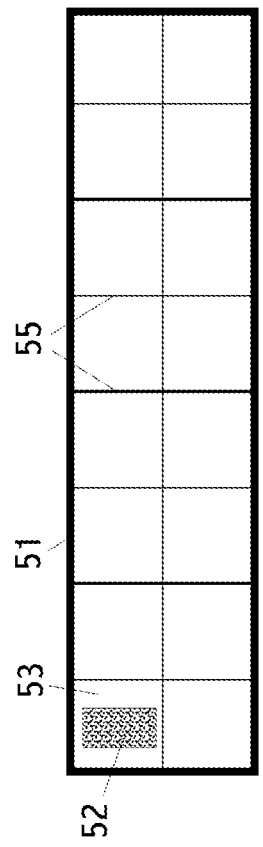
FIG. 4 shows an exemplary arrangement of image segments in a diffuser.

Turning now to FIG. 4, we see a schematic view of a diffuser, show by bold outline 51. In this Figure, 16 segments or partitions of the diffuser 51 are shown by the light lines 55. A diffuser typically has no such partitions or partition lines as separate physical elements; these light lines are in the Figure solely to identify different regions, or portions, of the diffuser. Light from the beam director (33 in FIG. 3) passes through the diffuser in one portion, such as shown by patterned area 52. In this embodiment, there are 16 different possible beam positions (P=16) and so there are 16 functional areas, or segments, such as 53, one per beam angle. Again, each beam angle corresponds to one of P illumination reduced fields of view. The area 52 shows an example of where the beam passes through the diffuser. Area 52 is shown in the Figure as smaller than region 53, for clarity. Note, however, that as discussed for FIG. 2, above, each of the P beams is nominally contiguous with other P beams, but also, ideally, overlaps slightly. Thus, in practice, the patterned area 52 may be slightly larger than area 53. Similar to FIG. 2, bolder lines indicate respective areas that are ultimately imaged by the individual image sensor chips in the imaging subsystem. Note that no imaging light passes through the diffuser 51. Such a relationship between the P (here, 16) illumination beams and the N (here, 4) image sensors is purely instructional. A purpose of the diffuser 51 is to make embodiments eye-safe, by making the effective, "as seen," breadth (subtended solid angle) of the illumination beam sufficiently large. This is an important benefit over prior art. Laser LIDARs provide a very bright, potentially non-eye-safe, point light source. Flash LIDARs may provide a larger apparent light source breadth (extended object), but at extreme brightness, thus also being potentially being non-eye-safe. A diffuser 51 may be made of an optically suitable plastic or glass. In one embodiment the diffuser is an engineered diffuser. Such an engineered diffuser may spread the beam over a predetermined solid angle. Such a solid angle may have various shapes, such as a cone or rectangular solid angle. Note that the illumination beam exiting the diffuser presents an extended object of the size of an illumination beam cross section to the viewer which substantially increases eye safety. A larger distance between the beam director and the diffuser creates a larger extended object and is thus, all else being equal, more eye-safe. "Eye-safe" may mean different things in different contexts; construction of the term herein is defined by applicable international standards directed to eye-safety from light sources.

Figure 5:
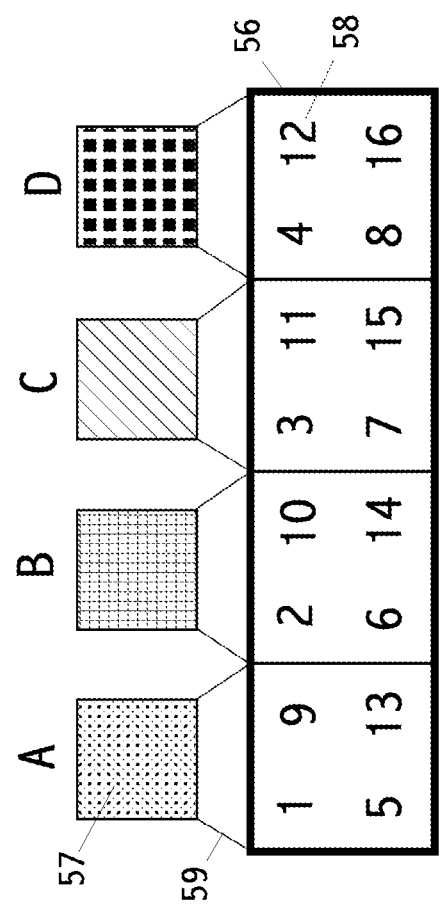
FIG. 5 shows an exemplary association of sensors with illumination segments and scan order.

Turning now to FIG. 5, we observe that it shows a representative 8×2 arrangement of image segments. Other embodiments may have significantly different arrangements, including arrangements that have only a single row or a single column. In some embodiments the shape of segments differs substantially from square. For example, segments may be arranged in a row where each segment is tall and narrow.

Continuing with FIG. 5, we see a relationship between individual image sensor chips, (here, 4, labeled A through D), and a set of P (here, 16) illumination beams angles, numbered 1 through 16. 57 shows individual sensor chip A. A key aspect of this Figure is the numbering sequence. Element 56 may be considered as the diffuser (51 in FIG. 4), with identified areas 1 through 16 being portions of the diffuser through which each of the individual 16 illumination beams pass. Note that since the illumination subsystem and the imaging subsystem are substantially separate physical subsystems, such a relationship as shown in this Figure is illustrative, not physical.

Continuing with FIG. 5, the numbers 1 through 16 show one possible time-sequence of illumination and operation of an embodiment. For example, an embodiment may use beam position 1 to first illuminate an illumination reduced field view. Reference designator 58 shows, for this example, a twelfth beam position. Light from beam position 1, a first illumination reduced field of view, is integrated by a portion of image sensor A. Next, the embodiment uses beam position 2 to illuminate a second selected illumination reduced field of view. Light from this beam position 2 illumination reduced field of view is imaged by a portion of image sensor B. Next, the embodiment uses beam position 3 to illuminate a third illumination reduced field of view. Light from this beam position 3 illumination reduced field of view is imaged by a portion of image sensor C. Similarly, image sensor D is used to next integrate light from beam position 4. After beam position 4, the next beam position 5, is imaged again by a portion of image sensor chip A. This continues with beam positions 6 through 8, using image sensors B through D, respectively. Then, beam position 9 is again integrated and imaged by a portion of image sensor A. This continues until all 16 beam positions have been imaged. Thus, in this exemplary sequence of 16 illumination beam positions, each of the four image sensor chips is used four times. See also FIG. 6. Note that due to alignment and optical overlap, a few pixels at the edges of the image sensors A through D may not be used in final, stitched 3D representations of the a total FOV. The order of illumination beams 1 through 16, in this exemplary Figure, may be arbitrary. However, as will be discussed below, there are significant advantages of using the order shown, although other embodiments may use different orders. Lines 59 assist in understanding the Figure. For example, they indicate that image sensor A is used to image light from illumination beams 1, 5, 9 and 13. Such lines 59 do not physically exist.

Continuing with FIG. 5, we note that the Figure shows a two-dimensional grid of reduced fields of view, specifically, arranged as two rows of eight. In some embodiments, a grid of reduced fields of view may be one-dimensional, oriented either vertically or horizontally. For example, from the Figure, segments 1 and 5 could be combined, and 9 with 13, etc. to combining 12 with 16.

Some embodiments have more than one light source, such as 42 in FIG. 3. Such additional light sources as 42 permit, in some embodiments, more than one illumination reduced field of view to be illuminated, and then imaged, at the same time. Note the "offset" of light integration time and read out time, as shown in FIG. 6, may still apply when more than one image sensor is active at the same time. For example, image sensor chips A and C may operate at the same time, and then image sensor chips B and D operate at the same time. While A and C are reading out data, B and D are integrating light. Embodiments employing such simultaneous use of more than one sensor chip, while still offsetting light integration and read out times, are specifically claimed. In some embodiments, even with a single light source, more than one illumination field of view may be illuminated at once, in this way permitting more than one image sensor chip to be in a light integration mode at once.

In general, a brighter light source permits an illumination reduced field of view to be farther away—that is, such an embodiment has a longer range, all else being equal. At the same time, a dimmer light source may permit closer objects to be imaged, without having an image sensor saturate, as can happen if there is more light integrated by an the pixel image than it can store. Therefore, to improve or maximize dynamic range for an embodiment, a brightness of a light source maybe dynamically adjustable. Such an embodiment is specifically claimed. In addition, a brighter light source may permit a faster scan rate, due to a lower integration time required for each of the P illumination reduced fields of view.

In some embodiments, the size (e.g., solid angle) of different illumination reduced fields of view may be different. As one application, some such reduced fields of view may be optimized for more distant objects, while other such reduced fields of view are optimized for closer objects. A beam director could be used to achieve this, by having one or more of the P segments of the beam director spread the beam more than other of the P segments. A wider beam spread makes the light intensity at an object at a given distance less—suitable for closer objects; while a narrower beam spread makes the light intensity at an object at a given distance more—suitable for farther objects. Such embodiments are specifically claimed. As one application example, for a 3D imaging system on the roof of a car, closer objects are typically lower in a field of view and farther objects are typically higher in a field of view. Thus, a lower light intensity may be used for the lower reduced fields of view; while a higher light intensity may be used for the upper reduced fields of view. Similarly, the size or shape of the P segments may vary. Similarly, light integration time may vary between segments.

In some embodiments, the focal length of one or more lenses is different than the focal length of other lenses. This permits the size of the N imaging reduced fields views to be variable. Such embodiments are specifically claimed. In addition, the combination of both different sized illumination reduced fields of view and different sized imaging reduced fields of view is a claimed embodiment.

In some embodiments a vertical angle (or elevation angle) is different than horizontal angle (or azimuth angle) for illumination beam spread. That is, the illumination reduced fields of view are "rectangular" rather than "square" or Gaussian. (Taking into account shape distortion due to a curved field of view, or vignetting, as necessary.) Such embodiments are specifically claimed. Note that laser-based LIDARs, with a nominally Gaussian beam shape, cannot have this feature with respect to a single illumination spot.

Turning now to FIG. 6 we see a timing diagram associated with four (N=4) image sensors, labeled A though D. The four timing diagrams, one to the right of each image sensor A through D, indicate when an image sensor is in an imaging (light integration) mode or a data read out mode. As explained elsewhere herein, other modes are possible, including hybrid modes where one portion of an image sensor operates in a different mode than another portion of the same image sensor. To use a term borrowed from analog imaging, the "shutter is open." The lower trace in each of the four timing diagrams indicates a time when data is being of the respective image sensor to the left. Or, during some of this time the image sensor may be idle. Times are not to scale. However, note that the read out time is significant compared to the integration time. In some embodiments read out time may be relatively short or even fully overlapped with integration time. An advantage of embodiments and a key benefit over prior art is that light integration time of one image sensor is overlapped with read out time of one or more other image sensors. This physical and timing arrangement avoids "dead time" where an illumination beam is off to accommodate read out. For example, in this Figure, image sensors B, C and D are integrating light (that is, "imaging") while image data is being read out from image sensor A. Note that the 16 numbers shown are time sequential. These correspond generally to the same 16 numbers shown in FIG. 5. A specifically claimed embodiment is N is greater than or equal to (read out time/integration time)+1. Read out time may include associated processing time.

Continuing with FIG. 6, the waveforms in some embodiments differ significantly from those shown in this Figure. For example, read out times may be shorter than integration time. In another embodiment, there are multiple integration times prior to one read out. The number of sensor chips may be as few as two. It is worth noting that in preferred embodiments, each integration time period includes a large number of individual sensor pixel demodulation integrations. For example, a modulation clock may be 10 MHz, while an overall effective frame rate of an embodiment is 50 Hz. In addition, each shown integration time, such as 1, 2, 5, and so on, may comprise internally multiple different relative phase angles between an illumination modulation signal and a demodulation signal. Alternatively, each integration time, such as 1, 2, 5 and so on may comprise a different phase angle between an illumination modulation signal and a demodulation signal.

Figure 7A:
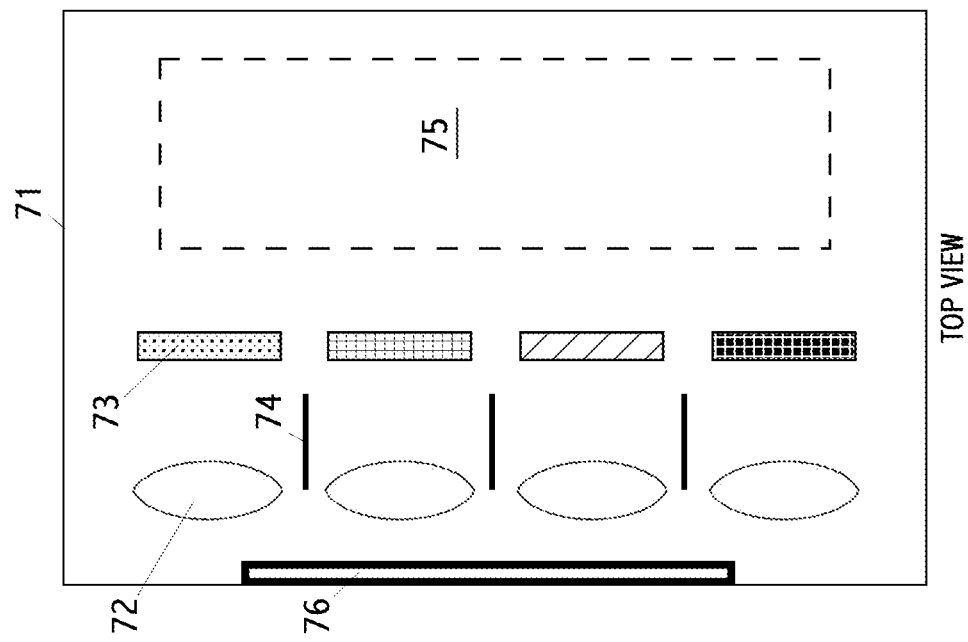
FIG. 7A is a top view showing select elements of an exemplary imaging subsystem.
Figure 7B:
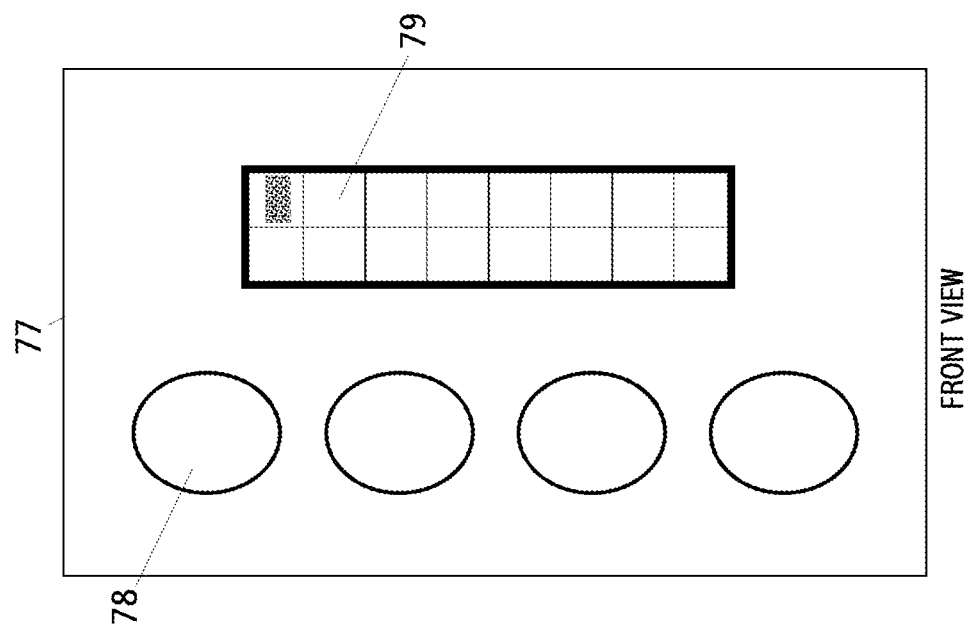
FIG. 7B is a side view showing select elements of an exemplary imaging subsystem.

Turning now to FIGS. 7A and 7B, we see an exemplary arrangement of elements in an optical imaging subsystem in two views of a physical device. Note that the symbols used in these Figures are symbolic and do not represent the size, shape or appearance of their respective elements. Again, for convenience, we use N=4 and P=16 for these two Figures, although N and P may be different numbers in different embodiments. In addition, many other arrangements of elements are possible in other embodiments.

FIG. 7A shows a top view of a device. 71 indicates a perimeter or case of the embodiment. The area 75 shown by a dotted outline may comprise a controller or other electronics. Elements such as circuit boards, heat sinks, fans, and mounting hardware are not shown. Four image sensors (N=4), such as chips of modules, are shown in side view, each with a different pattern. 73 identifies one such image sensor. These might correspond, for example, to image sensors A through D in FIGS. 5 and 6. 72 shows one of four (N=4) lenses, side view, each lens focusing light for its respective, associated image sensor. 74 represents an optional light baffle between optical elements to minimize reflected light. Elements 72, 73 and 74 are part of the imaging subsystem. Control electronics in 75 are interfaced to elements in both the illumination subsystem and imaging subsystem. A side view of a diffuser, part of the illumination subsystem, is shown 76. As can be seen in FIG. 7B, the diffuser is not in the light path for the lenses 72.

FIG. 7B shows a physical front view of a device, corresponding roughly, although symbolically, with a device shown in FIG. 7A. 77 shows an outline of enclosure of a device. Four lenses are shown, one labeled 78, correspond to the four lenses 72 in FIG. 7A. 79 shows a front view of a diffuser, such as 76 in FIG. 7A, or 34 in FIG. 3, or 51 in FIG. 4. See discussion for those Figures for more information about the diffuser 79. Again, note that the light lines and patterned area in the diffuser 79 do not, typically, exist as visible dividers in physical diffusers. Lenses 78 are shown as ellipses, rather than circles, to indicate that these lenses may not be rotationally or spherically symmetric. Lenses 78 may be shaped, positioned or optimized for off-axis imaging. Because they may be optimized for off-axis imaging, in some embodiments, they may have a customized optical shape. For example, a lens may comprise a "prism" optical aspect. Such lenses may be quite complex, each comprising multiple non-spherical optical elements, coatings, alignment and focus capabilities, and the like. In addition, although both the lenses 72 and 78 are shown arranged linearly, as are the image sensors 73, no such linear arrangement of the elements is necessary. Many embodiments will not have such elements arranged linearly. Non-rotationally symmetric lenses, lenses mounted off-axis relative to their associated image sensor, and lenses incorporating prism are specifically claimed as elements of embodiment.

The physical arrangement of P individually scanned target areas (volumes, actually) using N sensors is variable. As shown in the drawings, the P areas are arranged as 2×8, and P/N=4. The beam director has P=16 different physical segments, arranged as two rows of 8 (see element 79 in FIG. 7B) each of which directs the beam to a different angle. Other arrangements include a single row, three or four rows, etc. The P areas do not need to be arranged in a rectangular grid. We emphasize that the P areas do not need to be imaged in a fixed order, and they do not need to be all imaged the same number of times per second. Specifically, claims are made to these attributes, including a dynamically alterable imaging sequence, and variable imaging rates for different elements of P. In addition, although typically the MEMs mirror uses P positions (angles) it does not need to use exactly the same number of angles as P, and the actual angles may be variable. For example, one such MEMs mirror angle may direct light through more than one element of the beam director. In addition, integration time for each of P image volumes need not, indeed will often not, be the same. Longer integration times permit fainter light, and more distant objects to be imaged or detected. Shorter integration times generally (but not always) lead to faster scan rates and also may per closer objects to be more accurately imaged or located. Modulate frequency may be dynamically adjustable. Neither the lenses, 78 in FIG. 7B and 72 in FIG. 7A need be arranged in a plane or in a straight line. The image sensor chips, 73 in FIG. 7A, A though D in FIGS. 5 and 6, and 17 in FIG. 1 do not need to be arranged in a plane or in a straight line. Multiple lenses may be formed monolithically. Multiple images sensors may be on a single chip (die) or on a single module. The beam director may be monolithic, as shown in Figures, or may be comprised of multiple elements. The diffuser may also comprise multiple elements. A controller may be internal to a physical device, external, or its functionalities split into both internal and external portions. Embodiment may be combined with other elements or other inventions. Embodiments may be built into vehicles, bicycles, helmets, sports equipment and the like, or may be an add-in, add-on, or after-market device. It maybe consumer removable, such as a bicycle light. It may be inside a vehicle light assembly. It may be located inside or outside a vehicle body. It may be located at any location around a vehicle body, and at any height. It may look through a window.

FIG. 8 shows a timing diagram representing examples of signal synchronization. As those in the art know, two or more synchronized waveforms are not necessarily phase coherent, or the same shape, or the same frequency. Consider square wave signal A in the Figure. Signals B through H as shown are in time relationship with signal A. Signals B, C, D, and E show classic quadrature signals: each signal phase shifted 90 degrees from the previous signal. These are the same frequency, and here, are of the same shape, but vary in phase: they are synchronous. Signal F is a different shape: here, a modified triangle wave. It is the same frequency and nominally the same phase as signal A; nonetheless it is synchronous with signal A. Signal G is neither the same shape nor the same frequency as signal A; nonetheless it is synchronous with signal A. Signal H is a sine wave. It is half the frequency of signal A; nonetheless it is synchronous with signal A. These examples are non-limiting examples of synchronous signals or waveforms. In one embodiment, signal A represents a modulation signal used by the illumination subsystem, while signals B, C, D, and E represent four different demodulation signals used by the imaging subsystem. The use of multiple different phases and shapes for demodulation signals permits more accurate, wider dynamic range, and less noisy reception, integration and computation of time-of-flight. In one embodiment, integrated light values are read out of each imaging sensor chip for each of the four quadrature demodulation signals, and then all four sets of data are used to compute a single time-of-flight value for each pixel or pixel group being imaged by the sensor chip.

Additional Embodiments and Notes

One basic embodiment of the illumination subsystem comprises exactly a single light source, which may contain multiple light emitters; and exactly one two-axis MEMs mirror, and exactly one beam director, which may be comprised of multiple elements or be monolithic, and exactly one diffuser, which may be comprised of multiple elements or be monolithic. A modulator may be considered part of the illumination subsystem, part of the imaging subsystem, part of a controller, part of the total imaging system, or a separate element. A modulator may be incorporated into another element, such as an image sensor chip or an illumination element. Modulator frequencies and waveform shape maybe predetermined and fixed, or may be dynamically adjustable. Dynamically adjustable frequency is particularly advantageous to increase the distance dynamic range of an embodiment, and may be different for different ones of P illumination reduced fields of view.

Other embodiments include different number of elements that described above. P/N does not have to be an integer. A total illumination field of view (FOV) does not need to be the same, or nearly the same (such as slight larger, as explained elsewhere herein), as the total or target imaging field of view. Such total FOV do not need to be rectangular (or a rectangular portion of a curved or spherical FOV plane). Fields of view of the device do not have to be fixed relative to the device or a device upon which or in which an embodiment is mounted. For example, as a vehicle approaches a hill, it may be desirable that a vertical angle ("elevation") of a FOV or portion of a FOV be raised.

Focus, alignment or other calibration may be accomplished by manual adjustments, such as but not limited to screws or threads; may be accomplished by manufacturing robot positioning elements; or may be done dynamically such as by the use of piezo-electric transducers (PZT) to move or change the shape of elements. Calibration functions may include determining or changing the exact still (or "stare") positions of the MEMs mirror. Calibration functions may include selecting which pixel data to include or discard from the image sensors. Calibration functions may include adjustments based on differing parameters of pixels within one sensor chip or between sensor chips. Calibration functions may include variable parameters used for image (actually, "volume" or 3D image) stitching.

When creating a 3D representation (which may be called a "map" or "cloud") of objects in a target field of view, such as a primary purpose, use and benefit of embodiments of this invention, various coordinate systems may be used. The coordinate system used is non-limiting and typically unrelated to scope of a claim, unless otherwise stated in the claim. Exemplary coordinate systems include: a Cartesian coordinate system comprising X, Y, and Z; a coordinate system comprising X, Y, and Z, where, X, Y and Z are distances, but not necessarily orthogonal, nor necessarily use the same units, nor are necessary calibrated; a coordinate system comprising azimuth or elevation or both, as angles. A coordinate system may be relative to a physical device, relative to another object, or absolute; or may be a hybrid comprising both relative and absolute elements. A coordinate system may change dynamically and may be different for different portions of a field of view or different reduced fields of view.

r target field of view is partitioned. Such partition may be or may be referred to as: "reduced," "segmented," "partitioned," "limited," "partial" or " chunks." Such a partition may be two- or three-dimensional.

Data representing an object or a portion of an object may be binary, such as "present" or "not present" at a corresponding voxel location in space; or may be non-binary, such as gray-scale, representing either a level of reflectivity of the object (or portion or voxel value) or a probability of such a portion of an object actually being at the corresponding voxel location in space; or a portion of time that the object is reflecting within an integration time period.

The terms, "area," and "volume" are used both inconsistently and confusingly in the art. Interpretation and construction of the terms, and phrases using these terms must be done carefully using the full context. In addition, elements within a field of view, or a whole field, or a reduced field of view may be physical elements, such as a bicycle on a roadway, or a single pixel (or voxel) sensor on an image sensor chip; Or, they may refer to a representation, such as a time (or time interval), distance, angle or stored or transmitted, non-transitory data. Note that data is not abstract, but is in fact a physical thing(s), such as charges on a transistor gate in a memory or orientation of magnetic flux in a disk drive.

A first key differentiation over prior art LIDARs using laser beams is "line scan" v. "area scan." Laser-based LIDARS illuminate one point at a time and image one point at a time. A sequence of such points is in a line; even if a LIDAR uses multiple laser beams, each scans its own line of points. Embodiments of this invention differ in that an area, rather than a point, is illuminated and imaged at once.

A second key differentiation over prior art is that the total target field of view is comprised of more than one illumination reduced field of view. Unlike a flash LIDAR, however, embodiments segment the total field of view (FOV) into multiple segments, each segment comprising a reduced field of view. Each segment is illuminated and imaged at once. Sequencing of segments may be arbitrary. Also, illumination and integration times may be dynamically set, including different such parameters for different segments. The as-seen light maximum intensity from an embodiment of this invention is less than for a flash-based LIDAR, given the same level of sensitivity for imaging chips or sensors, the same size target field of view, and other parameters being equivalent. For the same as-viewed maximum light intensity, embodiments of this invention can image objects at a longer distance than flash-based LIDAR. In addition, embodiments of this invention use continuous wave modulation of a light source, compared to a flash or short pulse used by flash-based LIDAR.

A third key differentiation over prior art is that embodiments are, "eye-safe." Eye-safe is defined by appropriate Standards set by recognized international standards bodies, such as but not limited to: IEC, ANSI, SPIE, and the like. Eye-safe may also be defined by published government recommendations. Eye-safe may also be defined by published recommendations of a recognized ophthalmology medical organization or a recognized optics organization such as SPIE. Note that eye-safety is often treated as depending on wavelength of light used as well as irradiance level and spot size on a human cornea.

A fourth key differentiation over prior art is that embodiments are able to select illumination reduced fields of view in any arbitrary order and arbitrary dwell time (or light integration time, or MEMs mirror "stare" time).

A fifth key differentiation over prior art is that embodiments overlap in time the light integration of one image sensor chip (or module) with data read out of a different image sensor chip (or module). This permits illumination of a scene or field of view with a higher percentage of "light on" time than prior art that must "pause" between light integration intervals and data read out intervals. The time necessary to read out data from one image sensor is a read out time. For a given light power, field of view and image sensor sensitivity, this increases total scan rate, maximum operating distance or sensitivity, in some combination.

A sixth key differentiation over prior art is that embodiments place the power of the light source in an illumination reduced field of view, as compared to a total field of view of a prior art device, and so an increased optical intensity at an object in the field of view is available. This improves either maximum detectable distance of an object, improves signal-to-noise ratio, or improves scan rate, in any combination. It may also improve such operational parameters, over prior art, in brightly lit target fields of view, such as in full sunlight.

A seventh key differentiation over prior art is the use in some embodiments of light sources in the range of 830 to 1000 nm, or similar, rather than 1550 nm, such as may be used by prior art laser devices. In addition, such shorter wavelengths may have higher-power continuous wave light source available commercially and may have higher-sensitivity image sensors available commercially. Note that wavelength numbers such as "830" are industry identifiers; a spectral amplitude curve of such devices, whether for illumination, filtering or imaging, is more complex that a single wavelength. Operating wavelengths are non-limiting.

Boundaries between adjacent illumination reduced fields of view, boundaries between adjacent imaging reduced fields of view, and boundaries between illumination reduced fields of view and imaging reduced fields of view, may overlap, as discussed elsewhere herein, while remaining functionally contiguous, by percentages in the ranges of: 0% to 0.1%; 0% to 1%; 0% to 10%; 0% to 30%; 0.1% to 10%; 1% to 30%, as non-limiting ranges, where such percentages may be either percentages of total area or percentages of pixels along matching edges. Solid angle of beam spread for one illumination reduced field of view may be the range of: solid angle in the range 1% to 20%, or 2% to 15%, or 5% to 20%. Note that there is little practical advantage, other than overcoming calibration or drift limitations, and for calibration steps, of illuminating portions of a target field of view that are not imaged or imaging portions of a target field of view that are not illuminated by the embodiment.

Claimed elements, in any combination and any number of elements in any claim, explicitly include claims wherein:
the total illumination field of view, the total imaging field of view, the number P, and the number N, are predetermined in any combination. In particular, N and P may be fixed by design, thus predetermined and are changeable dynamically, as claimed embodiments;
N and P are both integer numbers;
P is an integer multiplier of N, as a claimed embodiment;
P is an integer multiplier of N, as a claimed embodiment, where the integer is 2 or more;
P is an integer multiplier of N, as a claimed embodiment, where the integer is 4 or more;
P is an integer multiplier of N, as a claimed embodiment, where the integer is 6 or more;
P is an integer multiplier of N, as a claimed embodiment, where the integer is 8 or more;
P is an integer multiplier of N, as a claimed embodiment, where the integer is an even number in the range of 2 to 24;
P is an integer multiplier of N, as a claimed embodiment, where the integer is an even multiple of three in the range of 3 to 24;
the number of MEMs mirrors may be one, two, three, four, or more; and
the illumination subsystem comprises exactly one light source.

The terms, "target field of view" and "total field of view," may refer to either a total illumination field of view, that is, the combination as a group of all illumination reduced fields of view; or a total imaging field of view, that is, the combination as a group of all imaging reduced fields of view; or a field of view that is both illuminated and imaged. In addition, the terms, "target field of view" and "total field of view," may refer to either the maximum possible field(s) of view of an embodiment or a particular field of view temporarily in use by the embodiment; depending on carefully construed context.

The device has a total field of view which is the maximum possible field of view the device is capable of imaging. As discussed above, this FOV is broken into regions, segments, or reduced fields of view. A "target field of view" is a field of view that is a current goal of the device to image. This may be the total field of view, or it may be a subset. For example, a total FOV may comprise 16 reduced fields of view. At the moment, however, the device is directed to only image 4 of these 16. This set of 4 reduced fields of view is the "target field of view." The size and shape of the target field of view may change dynamically and arbitrarily. Indeed, such capability is a core benefit of embodiments over the prior art.

When discussing a "mirror angle," in the context of a two-axis mirror, the singular "angle" may refer generally to a position of the mirror or it may refer to its position along only one of its two axes. When referring to a, "pair of mirror angles," the reference specifically identifies that both of the mirror axis scalars are to be included in the term, for a single position of the mirror. Thus, a "pair of mirror angles," defines a single position of the mirror; it does not mean two different positions of the mirror.

"Calibration" may comprise mathematical adjustments of the coordinates generated, by an embodiment, of any reduced field of field such that units in the coordinate system are the same, are consistent with the various P illumination reduced fields of view, are consistent the various N imaging reduced fields of view, or any combination.

"Calibration" may comprise adjustment of pixels or voxels used, by an embodiment, of any reduced field of field for the various P illumination reduced fields of view, the various N imaging reduced fields of view, or both, such that stitching of individual P or N reduced fields of view, or both, are functionally contiguous, by not using or re-using pixels or voxels at any combination of the boundaries of any reduced field of view.

"Calibration" may comprise adjustment of gray-scale values or threshold detection values, across an imaging reduced field of view. Such calibration may compensate for either vignetting (of either illumination or imaging reduced fields of view) or non-uniform illumination across an illumination reduced field of view. Such non-uniform illumination may occur due to "beam shape." (That is, beam intensity varies as a function of transverse distance across the beam from the beam center.) Calibration may compensate or correct for pixel-to-pixel variation in sensitivity, shape or response curve.

"Calibration" may occur at any time, such as: at a factory; at installation; periodically, during use; or periodically between uses; in any combination and non-limiting.

Some calibration may be performed in the controller, in an image sensor chip or module, or external a device enclosure. Not all calibration functions need to be performed within a same element.

A "non-resonant" mirror is distinguished from a "resonant" mirror, which functions with the mirror oscillating continuously at its resonant frequency; whereas a non-resonant mirror may be directed to any arbitrary position within its useful angular range(s), then stops at such an arbitrary position for an arbitrary period of time. Typically, imaging in an embodiment using the mirror does not occur while the mirror is moving, but rather occurs while the mirror is stopped. Alternative names in the art for a non-resonant mirror are a "step and stare" mirror or a "quasi-static" mirror. Note that most mechanical systems have some resonant frequency, even if at a very low Q. Therefore, even a non-resonant mirror may have residual oscillation that must be damped or timed-out after motion of the mirror, to create an effective stopped, or "stare" position. Ideally, such damping, if any, is "critically damped," as the term is used in the art. A mirror may be or comprise a prism, or have more than one reflective surface, or more than two axes of rotation. A "mirror," as used herein, may comprise more than one mirror, operatively and functionally coupled.

A controller operatively connected to a continuous wave light source may be configured or adapted to turn the light source on and off, or more complex functions or modes of the light source may be selected by the controller, such as frequency or waveform shape. The light source, a light sensor, other electronic sensor, or light monitor may provide data back to the controller about the state of the light source. Such a connection may be viewed as "control," even if the data flows from the light source or sensor to the controller. Also, such a sensor or monitor may be considered part of a, "controller." In one embodiment, the controller does not control the light source, but rather when power is applied to the light source it turns on and is functionally operational. The term, "controller" needs to be construed broadly, as one in the art knows. Control functions or a controller may be distributed within an embodiment.

Various elements of embodiments may be combined or integrated with other elements. For example, synchronous operation of the light source and arrays of sensors may be implemented on or in an array, or on a chip or module. Similarly, an oscillator or modulator, such as a fixed oscillator or variable frequency oscillator, such as a voltage controlled oscillator (VCO), may be implemented partially or fully with or inside of another element, such as in an image sensor chip or module. Physical boundaries between physical elements are non-limiting, particularly with respect to elements defined in claims. That is, there may not be a one-to-one correspondence between easily identifiable physical components, such as a chip of module, and elements in a device claim or elements to implement a method step. Some elements in claims may be distributed across more than one physical component in an embodiment.

Optical elements may be combined into a monolithic component or module, without changing the scope of a claim that lists such optical elements individually.

Positions, angles and sizes of optical arrows in Figures are schematic only, unless otherwise stated.

Shapes of waveforms such as sine waves, pulses or square waves in Figures and text, are schematic only, unless otherwise stated.

The following elements or attributes are specifically claimed embodiments:
  maximum operating distance of at least 200 meters;
  angular resolution of 0.1 degrees or less;
  total field of view of at least 60° horizontal and at least 20° vertical;
  scan time for a total field of view in 0.100 seconds or less;
  scan time for a total field of view in 0.033 seconds or less;
  scan time for a single illumination reduced field of view of 4 milliseconds or less;
  scan time for a single illumination reduced field of view of 2 milliseconds or less.

Image stitching may be performed internally in an embodiment, such as in the controller or in another element, such as a "stitching element," or may be performed external to an embodiment, or in combination.

Calibration may be performed internally in an embodiment, such as in the controller or in another element, such as a "calibration element," or may be performed external to an embodiment, or in combination.

A typical modulator frequency is in the range of 20 KHz to 200 MHz, 200 KHz to 150 MHz, 10 MHz to 200 MHz, or 650 KHz to 2 MHz, or 10 MHz to 150 MHz. Specifically claimed are embodiments wherein the modulation frequency is dynamically adjustable.

Image sensor chips may incorporate individual light sensors (pixels) in an arrangement range of: 240×320 to 1024×2048, or another arrangement or quantity. Image sensor chips pixel counts and arrangements are non-limiting.

Embodiments may have Q distinct and separately controllable light sources, each with its own associated, distinct and separately controllable MEMs mirrors, and each with its own associated, distinct beam director or dedicated portion of a beam director. Such embodiments may have Q distinct diffusers or the Q light sources may share a single diffuser. Such embodiments may be considered to have Q illumination subsystems. Such embodiments have four potential operating modes: (1) all illumination subsystems illuminate the same illumination reduced field of view at the same time or at different, but overlapping times; (2) the illumination subsystems illuminate different illumination reduced fields of view, each such illumination reduced field of view being imaged by the imaging subsystem using different two-dimensional arrays of light sensors; (3) the illumination systems operate at different light intensities such that a total dynamic range (usable distance from device to an object in a field of view) is increased over the use of a single illumination subsystem; (4) the illumination subsystems operate redundantly. The four operating modes are not mutually exclusive and may be selected dynamically. The operating modes are not limiting.

Construction of terms herein and in associated claims and drawings is first: as described and used herein; second: terms as generally used in the art; third: as used in four documents: "Datasheet_EPC660.pdf," "Datasheet_epc660_EvalKit-V1.25.pdf," "AN07_epc600-V1.1.pdf," "AN10_Calibration_and_Compensation_Notice.pdf," all from ESPROS Photonics AG or ESPROS Photonics Corporation, St. Gallerstrasse 135, 7320 Sargans, Switzerland. Note that not all terminology used in either the art or in the above four documents from ESPROS is consistent. Therefore, careful consideration of context is critical in evaluating construction of terms.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate. Use of the word, "invention," means, "embodiment."

All examples are sample embodiments. In particular, the phrase "invention" should be interpreted under all conditions to mean, "an embodiment of this invention." Examples, scenarios, and drawings are non-limiting. The only limitations of this invention are in the claims. All numerical ranges in the specification are non-limiting examples only. May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substation thereof to any and all other device claims, including all combinations of elements in device claims. Claims for devices and systems may be restricted to perform only the methods of embodiments or claims.

What is claimed is:

1. An optical range imaging system comprising:
an illumination subsystem comprising:
a continuous wave light source, modulated by a light modulator;
a non-resonant MEMs mirror adapted to rotate independently on one or two rotational axes;
a beam director comprising P beam direction angles;
a diffuser comprising P diffuser segments; wherein each of the P beam direction angles corresponds with one of the P diffuser segments;
wherein the illumination subsystem is adapted to direct light from the continuous wave light source, then reflecting off the MEMs mirror, then aimed to one of P beam direction angles, and then through a corresponding diffuser segment towards one of P illumination reduced fields of view, wherein the P illumination reduced fields of view define, as a group, a total illuminated field of view;
wherein a controller is adapted to select a desired one of P beam direction angles of the beam director by setting one MEMs mirror rotational angle for each MEMs mirror rotational axis;
an imaging subsystem comprising:
a lens array comprising N focus lenses; wherein N is two or more;
a sensor array comprising N two-dimensional arrays of light sensors;
wherein each two-dimensional array comprises a light demodulator synchronous with the light modulator;
an output comprising a plurality of time-of-flight outputs;
wherein each time-of-flight output is responsive to a time-of-flight of reflected light from the illumination subsystem to a portion of at least one of the N two-dimensional arrays of light sensors;
wherein each of the N focus lenses corresponds to exactly one of the N two-dimensional arrays of light sensors;
wherein each of N focus lenses focuses light, from one of N imaging reduced fields of view, respectively, to the corresponding each two-dimensional array of light sensors;
wherein the N imaging reduced fields of view define, as a group, a total imaged field of view;
wherein the controller is operatively connected to the continuous wave light source, the light modulator, the MEMs mirror, and the N two-dimensional arrays of light sensors; and
wherein the controller is adapted to select the MEMs mirror rotational angles in any arbitrary sequence.

2. The optical range imaging system of claim 1, wherein:
the beam director comprising P beam direction angles comprises a prism array comprising P prisms.

3. The optical range imaging system of claim 1, wherein:
the beam director comprising P beam direction angles comprises a diffractive optical element with P segments, wherein each of the P segments is adapted to direct reflected light from the MEMs mirror to a fixed beam direction angle.

4. The optical range imaging system of claim 1, wherein:
the total illumination field of view, the total imaging field of view, the number P, and the number N, are predetermined.

5. The optical range imaging system of claim 1, wherein:
the total illumination field of view is functionally the same as the total imaging field of view.

6. The optical range imaging system of claim 1, wherein:
P is larger than N.

7. The optical range imaging system of claim 1, wherein:
P is equal to N times an integer larger than one.

8. The optical range imaging system of claim 1, wherein:
the imaging subsystem has no moving parts in normal use of the embodiment.

9. The optical range imaging system of claim 1, wherein:
the embodiment is free of moving parts, in normal use of the embodiment, other than the MEMs mirror.

10. The optical range imaging system of claim 1, wherein:
the embodiment is eye-safe per international standards in effect as of the filing date.

11. The optical range imaging system of claim 1, wherein:
the embodiment is eye-safe using a light source in the range of 800 to 1000 nm.

12. The optical range imaging system of claim 1, further comprising:
a light collimator located in an optical path between the continuous wave light source and the beam director.

13. The optical range imaging system of claim 1, wherein:
the illumination subsystem illuminates continuous object surfaces in an illumination reduced field of view, free of illumination gaps.

14. The optical range imaging system of claim 1, wherein:
the imaging subsystem images continuous object surfaces in an imaging reduced field of view, free of image gaps.

15. The optical range imaging system of claim 1, wherein:
each of the N two-dimensional arrays of light sensors comprises a light integration time and a data read out time; and
wherein N is greater than or equal to: [(the read out time divided by the integration time) plus one].

16. The optical range imaging system of claim 15, wherein:
the light integration time of a first of the N two-dimensional arrays of light sensors overlaps with the data read out time of a second of the N two-dimensional arrays of light sensors.

17. A method of optical range imaging using a device comprising all of the elements of claim 1, comprising steps:
(a) moving the MEMs mirror to a first one of P positions;
(b) holding the MEMs mirror still for a first arbitrary amount of time;
(c) illuminating a first selected one of P illumination reduced fields of view;
(d) integrating light from the first selected illumination reduced field of view on a first of the N two-dimensional arrays of light sensors;
(e) moving the MEMs mirror to a second, different one of P positions;
(f) holding the MEMs mirror still for a second arbitrary amount of time;
(g) illuminating a second, different, selected one of P illumination reduced fields of view;
(h) integrating light from the second imaging reduced field of view on a second, different one of the N two-dimensional arrays of light sensors;
(i) reading output data, responsive to the light from step (d), from the first selected one of P illumination reduced fields of view; simultaneously with step (h) above; and
(j) repeating steps (a) through (i) until all N two-dimensional arrays of light sensors have been used for integrating light and reading output data.

18. The method of optical range imaging of claim 17, wherein:
the reading output data in step (i), for one of N two-dimensional arrays of light sensors, overlaps with more than one integrating light in steps (h).

19. The method of optical range imaging of claim 17, comprising the additional step:
(k) repeating steps (a) through (j) until all P positions have been used.

20. The method of optical range imaging of claim 17, comprising the additional step:
(l) repeating steps (a) through (j) until an entire target field of view has been illuminated, piecewise, one selected illumination reduced field of view at a time.

* * * * *